United States Patent [19]
Rhodes et al.

[11] Patent Number: 5,803,015
[45] Date of Patent: Sep. 8, 1998

[54] DAIRY PARLOR ENTRY GATE

[75] Inventors: Kevin Rhodes, Shawnee, Kans.; Arthur C. Rogers, III, Mt. Vernon, Wash.; Ted Townsend, Kansas City, Mo.; H. Eugene Robbins, Jr., Mt. Vernon, Wash.

[73] Assignee: Alfa Laval Agri Inc., Kansas City, Mo.

[21] Appl. No.: 786,828

[22] Filed: Jan. 21, 1997

[51] Int. Cl.$^6$ ........................... A01K 1/12
[52] U.S. Cl. ............... 119/14.02; 119/14.03; 119/520
[58] Field of Search ............. 119/14.02, 14.03, 119/520, 524, 840

[56] References Cited

U.S. PATENT DOCUMENTS

| | | |
|---|---|---|
| 1,899,320 | 2/1933 | Dupuy . |
| 2,904,001 | 9/1959 | Ferris ................................. 119/14.03 |
| 3,128,744 | 4/1964 | Jefferts et al. . |
| 3,844,273 | 10/1974 | Polson . |
| 3,949,709 | 4/1976 | Myers . |
| 4,000,718 | 1/1977 | Brown ................................ 119/14.03 |
| 4,114,151 | 9/1978 | Denne et al. . |
| 4,196,697 | 4/1980 | Poiesz ................................. 119/54 X |
| 4,274,083 | 6/1981 | Tomoeda . |
| 4,463,353 | 7/1984 | Kuzara . |
| 4,513,690 | 4/1985 | Waldron . |
| 4,559,904 | 12/1985 | Harmsen . |
| 4,798,175 | 1/1989 | Townsend et al. . |
| 5,183,008 | 2/1993 | Carrano . |
| 5,420,757 | 5/1995 | Eberhardt et al. . |
| 5,584,261 | 12/1996 | Hart et al. ............................ 119/14.03 |
| 5,595,144 | 1/1997 | Löher ................................... 119/840 |
| 5,628,284 | 5/1997 | Sheen et al. ........................ 119/840 |

FOREIGN PATENT DOCUMENTS

| | | |
|---|---|---|
| 650715 | 2/1991 | Australia . |
| 56726 | 1/1981 | European Pat. Off. . |
| 3024692 | 1/1982 | Germany . |
| 211269 | 7/1984 | Germany . |
| 3702465 | 8/1988 | Germany . |
| 2053343A | 2/1981 | United Kingdom . |
| 8704898 | 3/1987 | WIPO . |

OTHER PUBLICATIONS

"A User–Friendly Parlor" by Rick Mooney in Sep. 1991 issue of Dairy Today, pp. 16–17.

Bou–Matic Publication No. 12P–040–0792 entitled "The Bou–Matic Xpressway Parallel Milking Center".

Bou–Matic Xpressway Herringbone Cow Parlor ad appearing at p. 5 of the Sep. 1994 issue of Dairy Today.

Pp. 44–45 and 50–52 of The Catalog for Dairy Equipment & Supplies Fall/Winter 1994 by Alfa Laval Agri Inc.

Pp. 285–306, 311–320 and 329–330 of *Milking Machines and Lactation* by A.J. Bramley et al.

*Primary Examiner*—Robert P. Swiatek
*Attorney, Agent, or Firm*—Hovey, Williams, Timmons & Collins

[57] ABSTRACT

A simple, efficient, and rugged dairy parlor entry gate which is especially useful for identifying animals, minimizing the need for lead animals to back up as the gates swing open, and provides for indexing the animals into proper position. The entry gate preferably includes a pair of opposed stanchions defining therebetween a passageway, at least one and preferably a pair of gate members, and mounting structure for swingably carrying the gate members and mounting them in offset relationship. An antenna may be provided in each of the gate members so that the interrogation field generated thereby swings with the gate member. The gate also preferably includes a motive member for swinging the gate members between an open position allowing the passage of animals therebetween and a closed position which both inhibits the passage of animals into the parlor and indexes the last animal into a proper position.

17 Claims, 3 Drawing Sheets

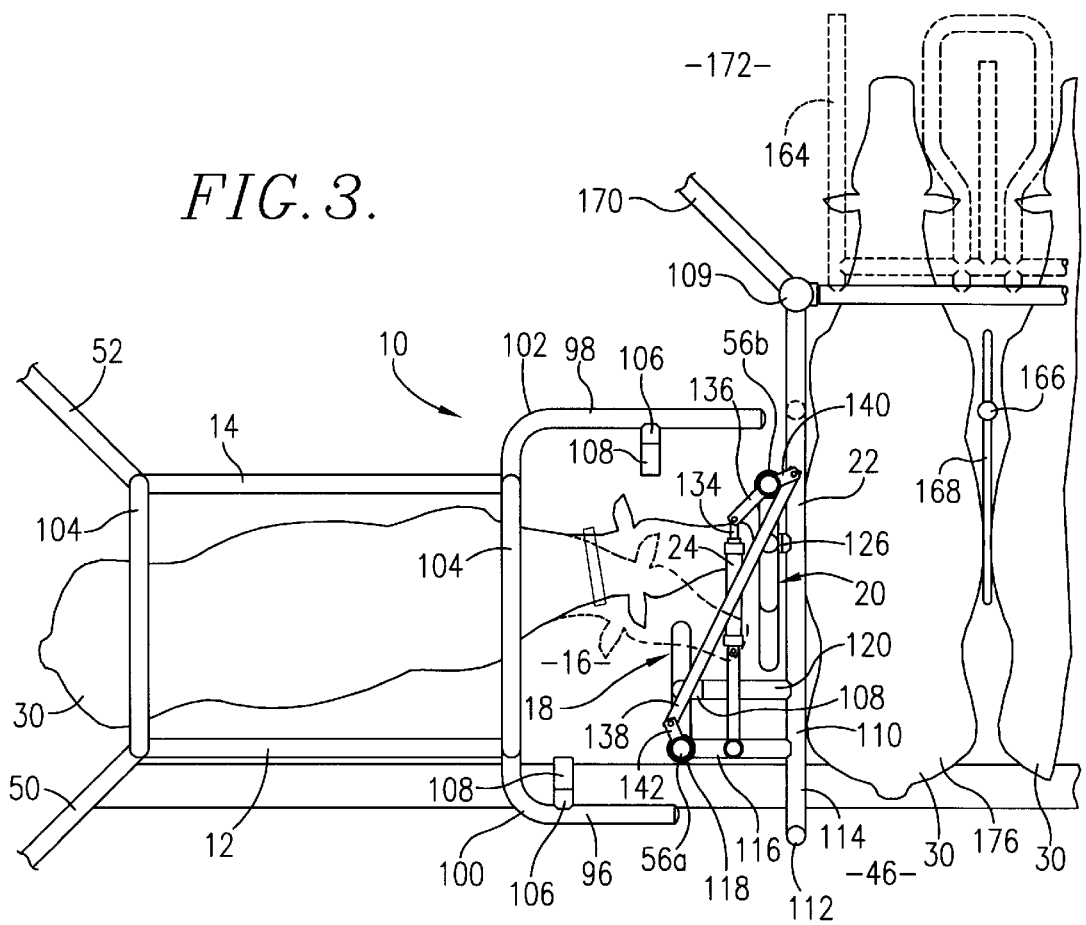
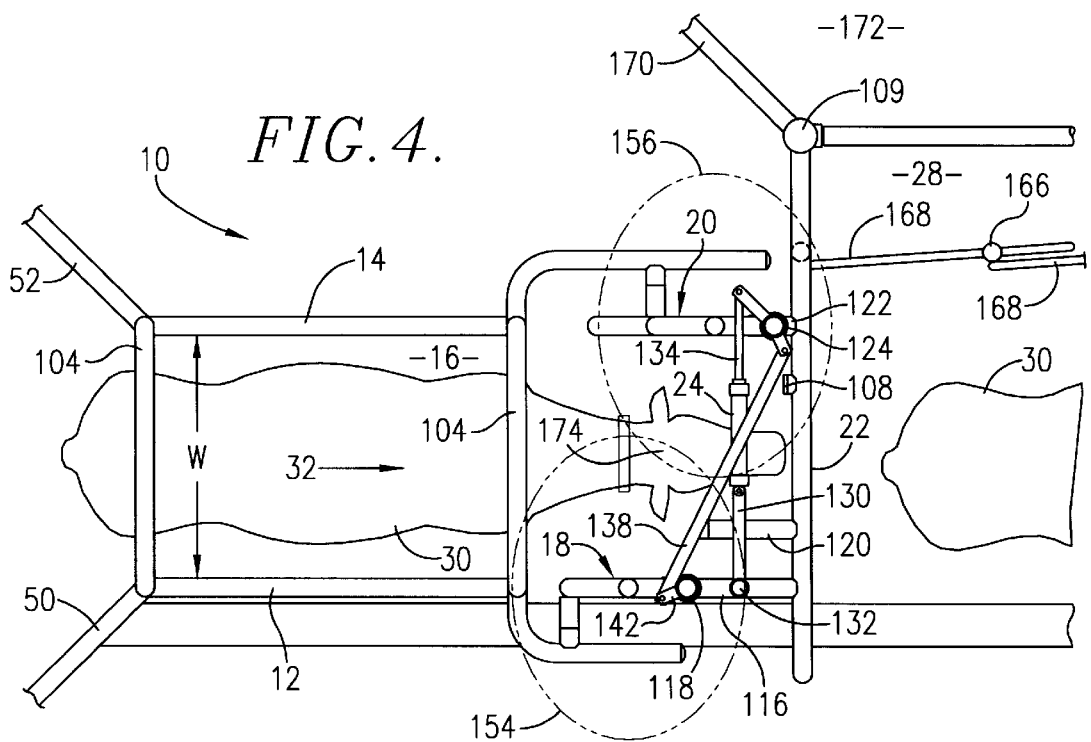

DAIRY PARLOR ENTRY GATE

BACKGROUND OF THE INVENTION

1. Field of the Invention

This invention relates to an entry gate for dairy parlors which provides for electronic animal identification, minimizes stress on animals awaiting entry, and aids in positioning the last animal in the parlor for milking, all in a durable construction. More particularly, it is concerned with a dairy parlor entry gate which includes a protected antenna located within rigid tubing of the swingable gate members, the entry gate including gate mounts which position the opposed gate members in offset relationship, and positioning the gate members to index the last cow in a parallel parlor into milking position.

2. Description of the Prior Art

Dairy parlor operations are increasing in size due to economics of scale, and as a result, the level of automation within the milking parlor has increased. This enables the same number of operators to milk more cows or other dairy animals within a given time period, and to maintain accurate information on the animals in the herd. Each animal wears a transponder collar or tag which, when interrogated, provides a responsive signal identifying the animal. Such transponder systems are well known to those skilled in the art and described in, for example, U.S. Pat. No. 4,798,175 to Townsend et al, the disclosure of which is incorporated by reference. The '175 patent to Townsend et al. shows an electronic identification system using a transponder worn by the animal which can be used in a dairy parlor for identifying animals entering the parlor. Typically, the animals, such as cows, enter the parlor in single file through an entry gate. When the entry gate opens in a parallel milking parlor, the first cow into the parlor moves to the farthest milking position, the second cow to the next farthest station, and so on as the remainder of the cows in the string fill the remaining slots. Thus, the last cow in the string moves into the position nearest the entry gate.

Problems have heretofore been encountered with this procedure. One problem is providing an antenna for interrogating the transponders near the gates to provide for a proper count and avoid misidentifying a cow in the string. In conventional transponder identification systems such as that disclosed by Townsend '175, the antenna device generates magnetic fields in directly opposed relationship on opposite sides of the path along which the cow or other animal walks. The opposing fields are weakest along the centerline of the path, and further the opposite fields have a tendency to cancel one another. This may result in a weak interrogating signal just where the transponder is most likely to pass. If the transponder is turned, the weak field at the center may fail to sufficiently energize the transponder worn by the animal, and no identification signal may be received by the antenna. As a result, failure to identify that animal may throw off the readings for all of the animals in the string. This has been complicated by the need to have the antenna positioned so that the magnetically conductive gates do not swing through the magnetic field generated by the antenna to avoid disturbance of the signal.

Previous identification systems have employed devices where the magnetic fields are relatively fixed. While this is usually acceptable, animals exiting the milking parlor may pass in sufficient proximity to the field that their transponders are energized and received. This is particularly true in parallel milking parlors where the animals may exit along a path which is reciprocal, adjacent and parallel to the entry path. Repeat identification of one or more exiting animals may cause misidentification of animals in the entering string. Another problem associated with the antenna device has been the need to provide a durable and reliable antenna which is protected from damage caused by the movement of large animals in close proximity.

The positioning of the gates in relation to the passageway into the parlor has also presented a problem. Dairy animals such as cows are typically crowded toward the entry gates to provide for animal control and more rapid ingress into the milking parlor. The animal closest to the entry gate is pushed by other herd members, making movement away from the gates difficult or even impossible. Thus, when saloon type gates swing open toward the first cow, she is placed under stress when it is difficult to back up or otherwise avoid the gate. This in turn disrupts the flow of animals into the parlor and may result in damage to the entry gates as the cows push against the gates. Once the last cow enters the parlor, another problem which has frequently occurs is the difficulty in indexing the last cow in the string into position. The term "index" in this context refers to positioning the cows in a parlor so that they are aligned with their heads pointing away from the central pit or alley used by the operator, and have their tails proximate a butt plate to divert urine and feces and position the udder near the milking cluster. The "last cow" problem involves the tendency of the final cow in a string entering a parallel parlor to fail move into a proper indexed position (turning perpendicular to the entering path of travel, thereby positioning her udder proximate the milking unit) and instead remain in a skewed position which hinders the ability of the operator to attach the milking cluster.

Thus, there has developed a need for a dairy parlor entrance gate which is durable and resistant to abuse by animals, includes animal identification capabilities, allows the gate to swing open without requiring the first or lead animal to back away from the opening gate, and can index the final cow of the string into proper milking position. Furthermore, there has developed a need for a dairy parlor entrance gate which reduces the incidence of failing to identify an animal passing into the parlor. Finally, there is a need for a dairy parlor entrance gate which enhances the identification capabilities and lessens the possibility of undesirable reidentification of one or more of the animals leaving the parlor, with the consequence of misidentification of animals in the entering string.

SUMMARY OF THE INVENTION

These needs are in large measure met by the dairy parlor entrance gate of the present invention. That is to say, the dairy parlor entry gate hereof advantageously provides a pair of gate members which are opposed to one another as well as offset in relationship to the path of the cows or other dairy animals moving therebetween. Each of the gate members are thus mounted to swing between a closed position blocking the pathway, and an open position between which the entering animals pass. The offset relationship both reduces stress to the animals when the gates open by avoiding the necessity of requiring the lead animal to back into the crowded herd to dodge the gates, and provides improved indexing for the last animal in the string when entering the stall in a parallel parlor. When antennas are provided in the gate members, improved interrogation and fewer failed identification instances or misidentification of the animals occurs.

The dairy parlor entry gate in accordance with the present invention broadly includes a pair of spaced-apart, opposed stanchions defining therebetween a passageway, at least one and preferably a pair of swingable entry gate members, and gate mounts swingably mounting the gates in offset relationship. Motive members, such as hydraulic cylinders or the like, are preferably provided to automatically open and close the gate members. Antenna wires are preferably routed through the gate members, whereby the interrogation field generated by the antenna wires moves with the swinging gate members, and the antenna is protected within the gate. The cows or other animals move along a path defined between the stanchions and are prevented from entering the parlor when the gates are closed and have their transponders interrogated when they pass between the open gates.

The gate members are preferably formed of a plurality of tubular components such as stainless steel that are electrically and therefor magnetically conductive. Normally, the formation of conductive loops in the gate members themselves would interfere both electrically and magnetically with the field intended to energize the transponder and the ability of the antenna to receive the resulting signal from the transponder. As a result, the present invention advantageously avoids the formation of magnetically conductive loops in the gate members by employing tubular couplers which are magnetically and electrically non-conductive and permit the passage of the antenna wire therethrough. The couplers are inserted between tubular components to break any magnetic flux or electrical current and enhance the effectiveness of the antenna wires within the gates.

If two gate members are utilized, the two gate members are preferably mounted so as to be staggered along the path of the animals moving along the passageway into the parlor. The downstream separation between the gates when closed is preferably sufficiently small to prevent an animal from passing therebetween, but still permit the gate members to open upstream with the upstream gate member in advancing relationship to the downstream gate member, thereby permitting the lead animal to move her head so as to avoid in sequence the upstream and then the downstream gate members without the necessity of moving back against the animals crowded behind her.

Advantageously, the downstream gate member includes an indexing extension which increases the lateral span of that gate member across the passageway. The downstream gate member is preferably positioned with the axis about which it swings more proximate the indexed animal's head than tail. This permits the extension on the downstream gate member to engage and urge the tail end of the animal toward a proper, indexed position during closing. The indexing extension is positioned low enough on the gate that the first or lead animal in the string may avoid the extension during opening simply by lifting her head.

These and other objects of the present invention may be appreciated by those skilled in the art with reference to the following description and the drawings.

BRIEF DESCRIPTION OF THE DRAWINGS

FIG. 3 is a top plan view of the dairy parlor entry gate and parallel milking parlor of FIG. 2, showing the last two cows of a string of cows in a parallel parlor, with the gate members closed to prevent passage of the first cow of the next string into the parlor, and showing in phantom the movement of the cow's head during opening of the gate members;

FIG. 4 is a top plan view similar to FIG. 3, showing the gate members in an open position to permit the entry of cows and a representation of the field generated by the antenna in the gate members to energize the transponders worn by the cows.

DESCRIPTION OF THE PREFERRED EMBODIMENT

Figure 1:
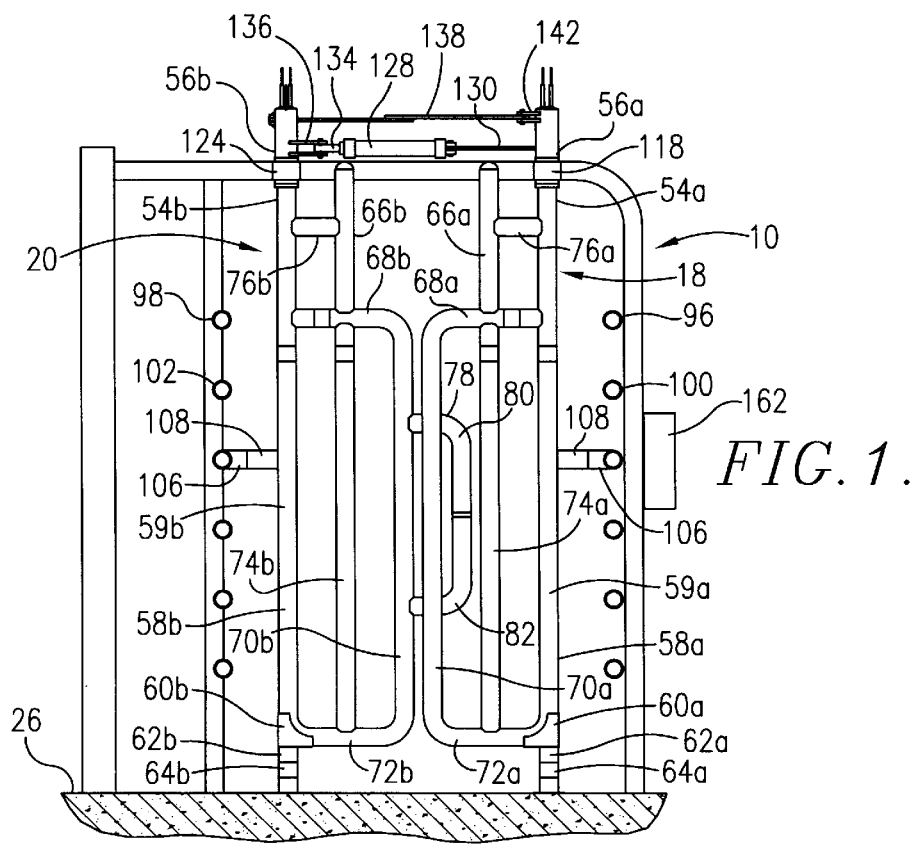
FIG. 1 is an elevation view of the dairy parlor entry gate of the present invention taken in section through the floor of the entryway to a parlor looking along the passageway between the stanchions from an upstream to a downstream direction.

Referring now to the drawing, a dairy parlor entry gate 10 in accordance with the present invention is shown in FIG. 1 and broadly includes a first stanchion 12 and a second stanchion 14 defining therebetween a passageway 16, a first, upstream gate member 18, a second, downstream gate member 20, portal 22, and motive member 24. The portal 22 and first and second stanchions 12 and 14 overlie a floor 26 presenting a pathway P along which animals move before entering a milking parlor 28, shown in FIGS. 2–5. It may be appreciated that while the invention hereof is especially useful for dairy cows in conjunction with a milking parlor 28, it is not intended to be limited to dairy cows but may be useful in handling beef cattle, goats, sheep, pigs or any other animal when controlled entry to of one or a number of animals to an area is desired. The present invention is shown as used in conjunction with a milking parlor for dairy cows, but could be used with pens, corrals, or any other area where restricted entry of animals is desired.

As shown in FIG. 4, passageway 16 is sized to receive a cow 30 for movement along a path 32. The passageway 16 is preferably sized for a single animal, and has a width W, defined as the distance between stanchions 12 and 14, of about 36 inches in the case of a passageway 16 sized for dairy cows. The cows 30 are retained in the passageway 30 when the gate members 18 and 20 are transverse to the path 32 and thus closed, as shown in FIG. 3. The stanchions 12 and 14 may include upright posts 34 and lead-in rails 36, which direct the cows' movement along pathway 32 from an upstream end 38 of the passageway 16 to a downstream end 40. Preferably, each cow 30 entering the passageway 16 has a collar 42 from which a transponder tag 44 is suspended, although it will be understood by those skilled in the art that transponders can also be attached as an ear tag or injected as a bolus.

The dairy parlor entry gate is shown in use with a parallel style milking facility wherein the floor 26 is elevated relative to an operators' pit 46 which typically separates two such floors 26 and provides access to the operator for attaching the milking machines to the teats of the cows on each of the floors separated by the pit 46. To direct the cows into the passageway 16 and prevent undesired movement of the animals into the pit 46, diversion panel 50 proximate the pit 46 side and first stanchion 12 and diversion panel 52 proximate the exit lane side and second stanchion 14 are provided. Thus, cows 30 may be crowded into single file strings entering the passageway 16 and through the portal 22 into the milking parlor 28.

Gate member 18 is located for swinging about an axis located on the pit 46 side of the passageway 16 and thus proximate the tail end of the animal in the parlor 28, while gate member 20 is located for swinging about an axis located on the exit lane side of the passageway and thus more proximate the head end of the cow 30 turned normal to the path 32 while in a milking position in the parlor 28. Each gate member 18, 20 includes a number of like components which are numbered similarly in the drawing, with the suffix "a" applying to the components of first, upstream gate member 18 and the suffix "b" referring to the components of the second, downstream gate member 20.

Each of the gate members 18, 20 thus include an upper axle bar 54 which carries a drive mount pipe 56. A D-shaped main tube 58 includes an axis leg 59 which extends downwardly from the upper axle bar to a curve upon which a bracket 60 is mounted. The bracket is provided of stainless steel or the like with an axle foot 62 extending downwardly to receive thereon a swivel isolator 64 of ultra high molecular weight polyethylene (UHMWPE) or other suitable electrically non-conductive material. The swivel isolator 64 of each gate member is received in a socket 66 which is embedded in or otherwise anchored into the floor 26. The main tube 58 also includes an upper arm 68, an outboard leg 70 and a lower leg 72. A column 67 intersects and is welded or otherwise secured to upper arm 68, with strut 74 welded or otherwise secured to and extending upwardly from lower leg 72 in alignment with column 67. Crossbrace 76 connects column 67 to upper axle bar 54 and provides additional rigidity to the gate member. With the exception of the swivel isolator 64, the aforementioned components of the gate members are preferably provided of tubular metal such as steel, aluminum or more preferably stainless steel.

Figure 5:
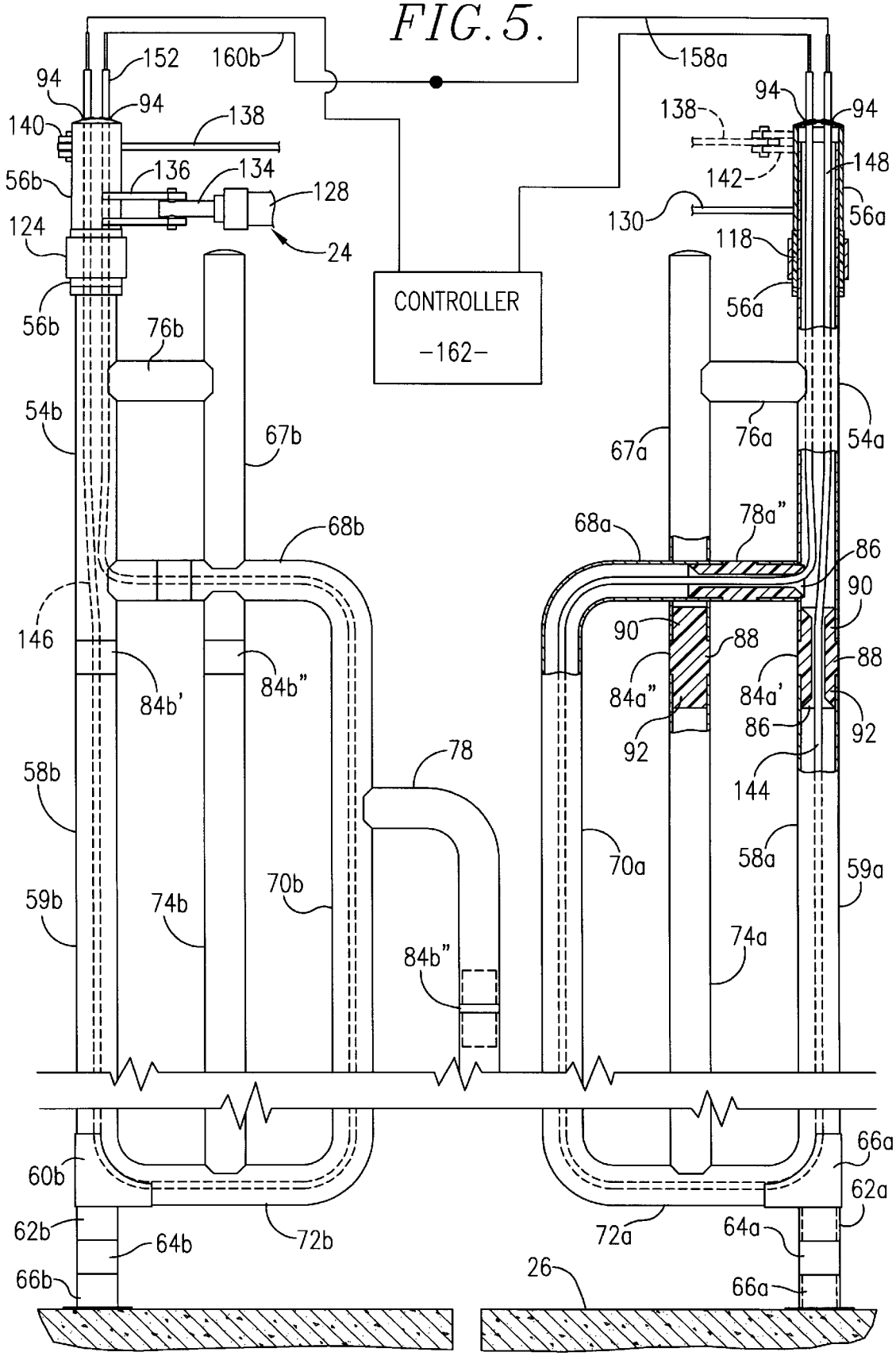
FIG. 5 is an enlarged, fragmentary in partial cross-section of the two gate members in separated presentation to show the routing of the antenna wires therewithin.

In addition, the second, downstream gate member 20 is designed so that the portion radially distanced from the swing axis comes proximate to the butt end of last cow 30 in the milking parlor 28. To assist in moving the cow 30 into a proper, indexed position, an indexing extension 78 is vertically centered on the outboard leg 70b as shown in FIGS. 1 and 5 and includes an upper bend 80 welded at its upper end to outboard leg 70b and a lower bend 82 welded at its lower end to outboard leg 70b. The various components, including upper bend 80 and lower bend 82 are joined but prevented from coming into contact by couplers 84, which may be tubular to present an access 86 therethrough in the case of couplers 84' or solid as in the case of couplers 84". Each of the couplers include an enlarged waist 88 which separates insert sections 90 and 92 sized to be received within the tubular components. The couplers 84 are preferably provided of UHMWPE or other synthetic resin materials. The drive mount pipes 56 are domed at the top and present a pair of apertures each receiving a rubber grommet 94.

The downstream end of the stanchions 12, 14 further include respective side fences 96 and 98 to prevent the escape of cows 30 from adjacent the gate members 18 and 20 when the gate members are closed. The side fences 96, 98 each include a plurality of respective vertically spaced curved bars 100, 102 which are connected to a post 32 of the stanchions, the posts 32 of each of the stanchions 12, 14 in turn being connected by an overhead arch 104 at both the upstream end and adjacent where the curved bars 100 and 102 are respectively connected to the downstream post 34. A stop 106 provided with a rubber or synthetic resin bumper 108 is secured by welding or the like to one of the curved bars 100 and one of the curved bars 102 to prevent the gate members 18 and 20 from swinging too widely apart and thereby engaging the curved bars 100 and 102. Such over-swinging has several disadvantages, including creating an undesired loop reducing the magnetic field, moving the gate members further away from the transponders as the cows move along the path 32, and overstressing the mounts and motive member 24, thereby lessening the mechanical efficiency.

Portal 22 includes an upright support 109 and a suspended archway 110. The archway 110 is unitary and presents an upright strut 112 anchored to the floor 26 and a crossbar 114 which is welded to the support 108. A first gate pivot mount 116 extends upstream from crossbar 114 and includes bearing fist 118 for pivotally receiving therein the drive mount pipe 56a of first upstream gate member 18. For dairy cow applications, the first pivot mount 116 positions the axis of rotation of the first gate 18 centered in bearing fist 118 about 14 to 15 inches upstream from the centerline of the crossbar 114. A stop bar 120 is connected to the crossbar 114 and oriented substantially parallel to the first pivot mount 116, the stop bar 120 presenting a bumper 108 thereon for engaging the column 67a of the first gate member 18 when the latter swings to a closed position across the path 32. A second gate pivot mount 122 extends a relatively short distance upstream from crossbar 114 and includes a bearing fist 124 thereon for pivotally receiving the gate mount pipe 56b of second downstream gate member 20 therein and defining a pivot or swing axis for the gate member 20. For example, in a typical dairy cow application, the second pivot mount 122 positions the pivot axis of the second gate member 20 and thus the center of the bearing fist 124 only about 3 to 4 inches upstream from the crossbar 114, thus providing an upstream separation and offset relationship between the first gate member 18 and the second gate member 20. A second stop bar 126 is connected to the crossbar 114 and positioned closer to the centerline of the passageway 16 than the second pivot mount 122, the second stop bar 126 also presenting a bumper 108 thereon for engaging the second gate member 20 when the latter swings into a closed, cow indexing position as shown in FIG. 3.

The gate members 18 and 20 are preferably simultaneously actuated by motive member 24 to swing between the closed position shown in FIG. 3 and the open position shown in FIG. 4. The motive member 24 is shown as including a double acting hydraulic cylinder 128, but it is understood that motors, screw and follower devices, or other devices for extending and retracting could also be used. As shown in FIGS. 3 and 4, one end of the hydraulic cylinder is pivotally connected to a link 130 in turn directly connected to a lug 132 on the first gate pivot mount 116. A reciprocating shaft 134 extends from the other end of the cylinder 128, the remote end of the shaft being pivotally connected to a drive mount tab 136 carried on drive mount pipe 56b of second gate member 20. The drive mount pipes 56a and 56b of the respective first and second gate members 18 and 20 are further interconnected to permit simultaneous movement of the first gate member 18 with the second gate member 20. A connecting rod 138 is coupled to a crank arm 140 of the drive mount pipe 56b of second gate member 20 and pivotally coupled to link tab 142 of drive mount pipe 56a of first gate member 18. The crank arm 140 and the drive mount tab 136 are in fixed angular orientation to one another, both being welded or otherwise secured to the drive mount pipe 56b, whereby retraction of the shaft 134 into the cylinder causes the drive mount tab 136 to swing toward the cylinder 128 and pull second gate member 20 to the closed position shown in FIG. 3. As the drive mount tab 136 swings in a counterclockwise direction as viewed in FIGS. 3 and 4, the crank arm 140 is also caused to swing in a counterclockwise direction, thereby pulling on connecting rod 138 and turning link tab 142 in a clockwise direction to close first upstream gate member 18.

First upstream gate member 18 receives therein an antenna 144 and second downstream gate member 20 receives therein an antenna 146. Each antenna 144 and 146 is in the form of an antenna wire 148 with a conduit 150 of copper or the like and a synthetic resin insulating sheath 152 to protect the wire and prevent short circuits with the gate members or other metallic components. FIG. 5 illustrates the routing of the antenna wire 148 through couplers 84' and the upper axle bar 54 and main tube 58 of each gate member 18, 20 wherein the antennas are respectively received within the gate member and swing therewith. The antenna 144 within the first upstream gate 18 produces a first magnetic field 154 which is roughly elliptical presenting two foci, as is the second magnetic field 156 generated by antenna 146 within the second downstream gate 20. As a result of their offset relationship along the path 32, the fields 154, 156 have respective predominant influences, with the first magnetic field 154 predominating upstream and closer to the pit 46, while the second magnetic field predominates downstream and toward the exitway side of the gate 10. To properly generate the first and second magnetic fields 154, 156 diagrammatically illustrated in FIG. 4, an axle wire 158 of one gate member is connected to the D-bar wire 160 of the other gate member, with the remaining axle wire 158 and the remaining D-bar wire 160 being routed for connection to an electronic board within a suitable controller, illustrated diagrammatically in FIG. 5 by reference character 162. To provide a substantial balance between the fields 154, 156, the wires should be of substantially equal length. A suitable controller for use in this application is the ALPRO™ automation system controller available from Alfa Laval Agri Inc. of Kansas City, Mo.

Figure 2:
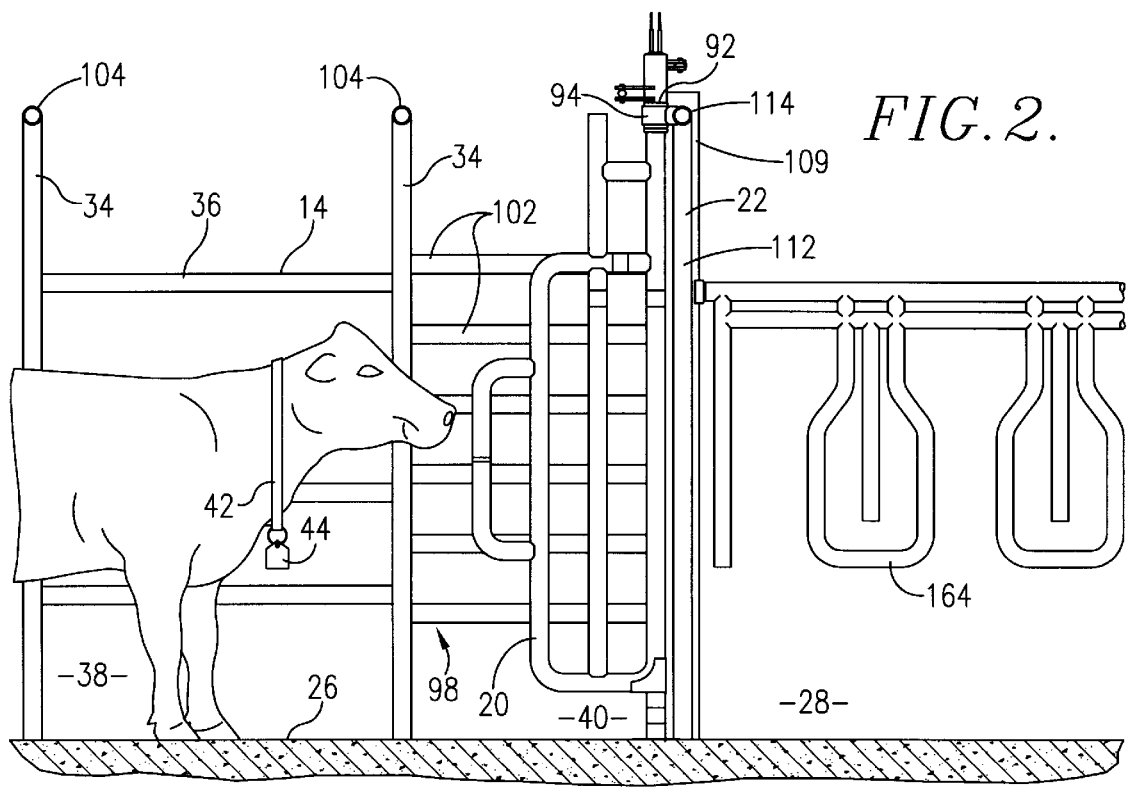
FIG. 2 is a side elevation view thereof in conjunction with a parallel milking parlor, showing the gate members open to permit the passage of a cow therebetween.

The milking parlor 28 illustrated in drawing FIGS. 2 through 4 is arranged in parallel milking stalls available as the Alfa Laval/Blue Diamond parallel stalls from Alfa Laval Agri Inc. of Kansas City, Mo. It may be appreciated that the present invention may also be used with other types of stalls or pens, including herringbone, tandem, and rotary milking parlors, as desired. Such parallel parlors include pivotally mounted gang-type headstalls 164 for holding (as in FIG. 2) or releasing (as shown in dashed lines in FIG. 3) a plurality of cows 30 at a time. In order to realign the cows 30 with their heads toward the headstalls 164 and their butts toward the pit 46, turnstyles 166 are provided which include dividers 168 which pivot about a vertical axis as each successive cow 30 in a string enters the parlor 28, proceeds to the furthest available stall, and is indexed into a parallel, milking position shown in FIG. 3. Upright support 109 is connected or positioned adjacent to an exit fence 170 which, together with diversion panel 52, keeps cows 30 not in passageway 16 away from the gate members 18, 20 to avoid miscounts and misidentification of cows 30 which are part of the entering string.

In use, cows 30 are kept in a holding area prior to milking and then crowded toward the entry gate 10 by the dairyman. The stanchions 12 and 14 are sized so that only one cow may pass along the path 32 at a time. When other cows are already in the parlor 28 beyond the portal 22 and being milked, then the gate members 18 and 20 are in a closed position across the path 32 to prevent movement of any cows therepast. This condition remains in a parallel or herringbone parlor until all of the cows in the parlor 28 are finished milking, while in a tandem or rotary parlor, the cows may be admitted individually or in groups as desired by the operator. The already milked cows then leave the parlor 28 in groups as the headstalls 164 lift to permit exit, the cows in FIG. 3 normally turning left along an exitway 172 and being kept away from the gate 10 by exit fence 170 to prevent unwanted interrogation of their transponders 44. After the operator has reset the controller and reoriented the turnstyles 166 to the position shown in FIG. 4, a new string of cows is ready to enter.

Because of crowding, the lead cow 30 normally has her nose close to the downstream gate member 20, as shown in solid lines in FIG. 3. The operator typically pushes a button generating a direct signal to swing the gate members 18 and 20 to the open position shown in FIG. 4, although this may be accomplished as a part of a sequence when the operator signals the headstalls to lower and the milking controllers to reset for the new string of cows. When the operator generates a signal to open the gate members 18, 20, the hydraulic cylinder 128 extends the reciprocating shaft 134 and thereby causes the drive mount tab 136 to swing the downstream gate member 20 open. At the same time, the crank arm 140 pushes on connecting rod 138 to move link tab 142 in a clockwise direction and swing the upstream gate member 18 open. Because of the staggered upstream and downstream relationship of the gate members, the lead cow's nose may already be past the first, upstream gate member 18 when the gate members 18, 20 begin to swing open, so that to avoid the swinging gate members she need only shift her head away (to the right in FIG. 3) from the downstream gate member 20 and lift her head over the indexing extension 78 to avoid the gate members without the need to back up against the other cows crowded against her butt.

As the gates members swing open the antennae 144 and 146 are energized and the magnetic fields 154 and 156 are generated. As a result, the transponder 44 is interrogated and its signal received by the antennae and routed to the controller to identify the cow 30 as a particular animal in the herd. The cow 30 moves along the path 32 through the portal and into the milking parlor 28 and, as the lead cow in the string, moves to the stall furthest away from the portal 22 and turns into a milking position as is conventional. As illustrated in FIG. 4, the magnetic fields 154 and 156 generated by the respective gate members 18 and 20 are offset in an upstream to downstream orientation. The overlap area 174 of the fields is advantageously small and oriented at a diagonal to the path 32. In this manner, cows 30 moving along the pathway 32 are more likely to be identified than in conventional parlors because even if they move along the centerline of the passageway, they will pass into successive areas of predominance of one field or another and thereby achieve a good interrogation and receipt of the transponder's signal by at least one of the antennae.

After the last cow 30 in the string passes through the portal, she is turned to the left into the "last cow" position 176 shown in FIG. 3. When the last cow in the string is recorded by the controller 162, the gate members 18 and 20 swing on their pivot axes which extend from the center of their respective bearing fist downward to their respective swivel isolators and sockets. The gate members 18 and 20 swing to the closed position as shown in FIG. 3. As the downstream gate member 20 closes, its indexing extension 78 may engage the butt or side of the cow 30 in the last cow position 176 to move her into proper alignment in the stall so that a line passing from her nose to her tail is substantially perpendicular to the path 32 along which she initially entered through the portal 22. This positions her butt against the buttplate on the pit 46 side of the stall to contain urine and feces and to position her udder proximate the milking machine. For this reason, the downstream gate member 20 should be positioned with its pivot axis on the other side of the passageway 16 from the pit 46.

It may be appreciated that as the gate members 18 and 20 close, the magnetic fields generated by the antenna within the gate members are also shifted toward the passageway 16. This advantageously swings the downstream gate member 20 and its antenna, which are closest to the transponder 44 worn around the cow's neck, a greater distance away from the transponder 44. Thus, when the cow 30 in the last cow position 176 is finished milking and the controller 162 is reset, there is less likelihood of interference or miscount by that cow's transponder 44.

The use of the stops and bumpers keeps the gate members 18 and 20 in proper orientation for moving the animals therethrough and optimizing the interrogation configuration. In addition, they help electrically and magnetically isolate the gate members from the remainder of the gate 10 and parlor components to avoid diffusion of the field and degradation of the interrogation results.

From the foregoing description of the preferred embodiment, those skilled in the art will appreciate that various modifications may be provided without departing from the invention limited only by the following claims.

We claim:

1. An entry gate for permitting access by dairy animals to a milking parlor comprising:
   a first stanchion and a second stanchion positioned in spaced relationship to said first stanchion defining therebetween an animal ingress passageway for permitting movement of animals along an entry path from an upstream end to a downstream end leaving to the milking parlor;
   a first gate member presenting an upright first gate pivot axis;
   a second gate member presenting an upright second gate pivot axis;
   a first gate mount pivotally mounting said first gate member with its pivot axis proximate said first stanchion and proximate the downstream end of the passageway for swinging between a first closed position oriented transversely across said passageway to imped the movement of animals along said path and a second open position wherein said first gate member is oriented substantially parallel to said path to permit movement of animals through said passageway; and
   a second gate mount pivotally mounting said second gate member with its pivot axis relatively proximate the second stanchion and proximate downstream end of the passageway with said first pivot axis of said first gate member positioned upstream relative to the second gate axis of the second gate member and permitting swinging movement of said second gate member between a first closed position oriented transversely across said passageway and downstream from said first gate member when the latter is in its closed position and a second open position oriented substantially parallel to aid first gate member when the latter is in its open position,
   said gate members, when in their respective closed positions, cooperatively presenting structure blocking the downstream end without impeding animal ingress through the upstream end and into the passageway.

2. An entry gate as set forth in claim 1, wherein said first gate member receives therein an antenna wire.

3. An entry gate as set forth in claim 2, wherein said first gate member includes a plurality of tubular metallic members interconnected by tubular non-magnetically conductive couplers, at least some of said couplers defining an opening for the passage of said antenna wire therethrough.

4. An entry gate as set forth in claim 3, including a controller electrically connected to said antenna wire within said first gate member for generating a magnetic field.

5. An entry gate as set forth in claim 1, wherein said second gate member receives therein an antenna wire.

6. An entry gate as set forth in claim 5, wherein said second gate member includes a plurality of tubular metallic members interconnected by tubular non-magnetically conductive couplers, at least some of said couplers defining an opening for the passage of said antenna wire therethrough.

7. An entry gate as set forth in claim 6, including a controller electrically connected to said antenna wire within said second gate for generating a magnetic field.

8. An entry gate as set forth in claim 1, including a motive member coupled to said first and second gate members for simultaneously swinging said first and second gate members about their respective upright pivot axis.

9. An entry gate as set forth in claim 1, wherein said second gate member includes an indexing extension for urging an animal which has moved downstream from said second gate member into an indexed position aligned substantially perpendicular to the entry path.

10. An entry gate for permitting access by dairy animals to a dairy parlor comprising:
    a first stanchion and a second stanchion positioned in spaced relationship to said first stanchion member defining therebetween an animal ingress passageway for permitting movement of animals along an entry path from an upstream end to a downstream end leading to the dairy parlor;
    a first gate member presenting an upright first gate pivot axis;
    a first antenna received within said first gate member for generating a magnetic field extending into said passageway;
    a second gate member presenting an upright second gate pivot axis;
    a second antenna received within said second gate member for generating a magnetic field extending into said passageway;
    a first gate mount located proximate said first stanchion and mounting said first gate member for swinging movement about its upright pivot axis between a passageway blocking position transverse to said entry path and a passage position substantially parallel to said entry path; and
    a second gate mount located proximate said second stanchion and mounting said second gate member for swinging movement about its upright pivot axis between a passageway blocking position transverse to said entry path and a passage position substantially parallel to said entry path.

11. An entry gate as set forth in claim 10, wherein said first and second gate members each include a plurality of tubular magnetically conductive members and at least one tubular magnetically non-conductive coupler interconnecting said magnetically conductive members.

12. An entry gate as set forth in claim 11, wherein each of said first and second antennae pass through the respective tubular magnetically conductive members and said at least one tubular magnetically non-conductive coupler to present respective first and second antenna loops.

13. An entry gate as set forth in claim 12, including a diverter extending away from said first stanchion for inhibiting animals which have exited the dairy parlor from moving proximate the antennae.

14. A method of identifying and controlling dairy animals entering and exiting a dairy parlor including the steps of:

provling an animal to be milked with a transponder worn proximate the animal's head;

moving the animal along a path through an entrance passageway presenting at least one path-blocking gate at a downstream end thereof;

swinging said at least one gate to an open position to permit movement of said animal therepast;

energizing said transponder to provide an animal-identifying signal by a magnetic field generated by an antenna received in said at least one gate;

electronically identifying the animal from the signal received by the antenna;

moving the animal into a stall within the milking parlor; and swinging said at least one gate to a closed position to thereby move the magnetic field.

15. A method as set forth in claim 14, wherein swinging of said at least one gate moves the magnetic field remotely relative to the transponder worn by the animal.

16. A method as set forth in claim 15, including releasing said animal from said stall while said at least one gate remains in said closed position.

17. A method as set forth in claim 16, including milking said animal in said stall before releasing said animal.

* * * * *